(12) United States Patent
Miyagi et al.

(10) Patent No.: US 10,345,685 B2
(45) Date of Patent: Jul. 9, 2019

(54) IMAGE PROCESSING DEVICE, IMAGE PROJECTION APPARATUS, AND IMAGE PROCESSING METHOD

(71) Applicants: Noriko Miyagi, Kanagawa (JP); Satoshi Ouchi, Tokyo (JP); Takuji Kamada, Kanagawa (JP)

(72) Inventors: Noriko Miyagi, Kanagawa (JP); Satoshi Ouchi, Tokyo (JP); Takuji Kamada, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/875,503

(22) Filed: Jan. 19, 2018

(65) Prior Publication Data

US 2018/0210327 A1 Jul. 26, 2018

(30) Foreign Application Priority Data

Jan. 25, 2017 (JP) ................. 2017-011489

(51) Int. Cl.
*G03B 21/14* (2006.01)
*G02B 26/08* (2006.01)
*H04N 9/31* (2006.01)
*G03B 21/20* (2006.01)
*H04N 5/74* (2006.01)

(52) U.S. Cl.
CPC ......... *G03B 21/142* (2013.01); *G02B 26/085* (2013.01); *H04N 9/31* (2013.01); *H04N 9/312* (2013.01); *H04N 9/317* (2013.01); *H04N 9/3188* (2013.01); *G03B 21/2033* (2013.01); *H04N 5/74* (2013.01)

(58) Field of Classification Search
CPC .... G03B 21/14; G03B 21/142; G03B 21/005; G03B 21/006; G03B 21/007; H04N 5/74; H04N 5/31; H04N 5/3102; H04N 5/3108; H04N 9/312; H04N 9/317; H04N 9/3188; G02B 26/085
See application file for complete search history.

(56) References Cited

U.S. PATENT DOCUMENTS

| 10,134,317 | B2 * | 11/2018 | Li | ............ H04N 9/31 |
| 2007/0176851 | A1 * | 8/2007 | Willey | ............ G02B 26/101 |
| | | | | 345/32 |
| 2011/0134135 | A1 * | 6/2011 | Ota | ............ H04N 5/142 |
| | | | | 345/581 |

(Continued)

FOREIGN PATENT DOCUMENTS

| JP | 7-334616 | 12/1995 |
| JP | 11-298829 | 10/1999 |

(Continued)

*Primary Examiner* — William C. Dowling
(74) *Attorney, Agent, or Firm* — Duft & Bornsen, PC

(57) ABSTRACT

An image processing device includes a resolution reducer, a detector, and a corrector. The resolution reducer generates, from an input image, low resolution images for pixel shift display being lower in resolution than the input image. The detector detects portions of the low resolution images corresponding to a specific pattern in which image quality degradation may occur. The corrector performs specific correction processing to reduce the image quality degradation on the portions of the low resolution images corresponding to the specific pattern.

12 Claims, 14 Drawing Sheets

(56) References Cited

U.S. PATENT DOCUMENTS

| | | | | |
|---|---|---|---|---|
| 2015/0138071 A1* | 5/2015 | Ichieda | ................ | G03B 21/14 |
| | | | | 345/156 |
| 2017/0244940 A1 | 8/2017 | Mikawa et al. | | |
| 2017/0272710 A1 | 9/2017 | Mikawa | | |
| 2018/0192018 A1* | 7/2018 | Nakamura | ............. | G02B 26/10 |

FOREIGN PATENT DOCUMENTS

| | | |
|---|---|---|
| JP | 2011-091618 | 5/2011 |
| JP | 2011-203460 | 10/2011 |
| JP | 2016-085363 | 5/2016 |
| JP | 2017-167286 | 9/2017 |

* cited by examiner

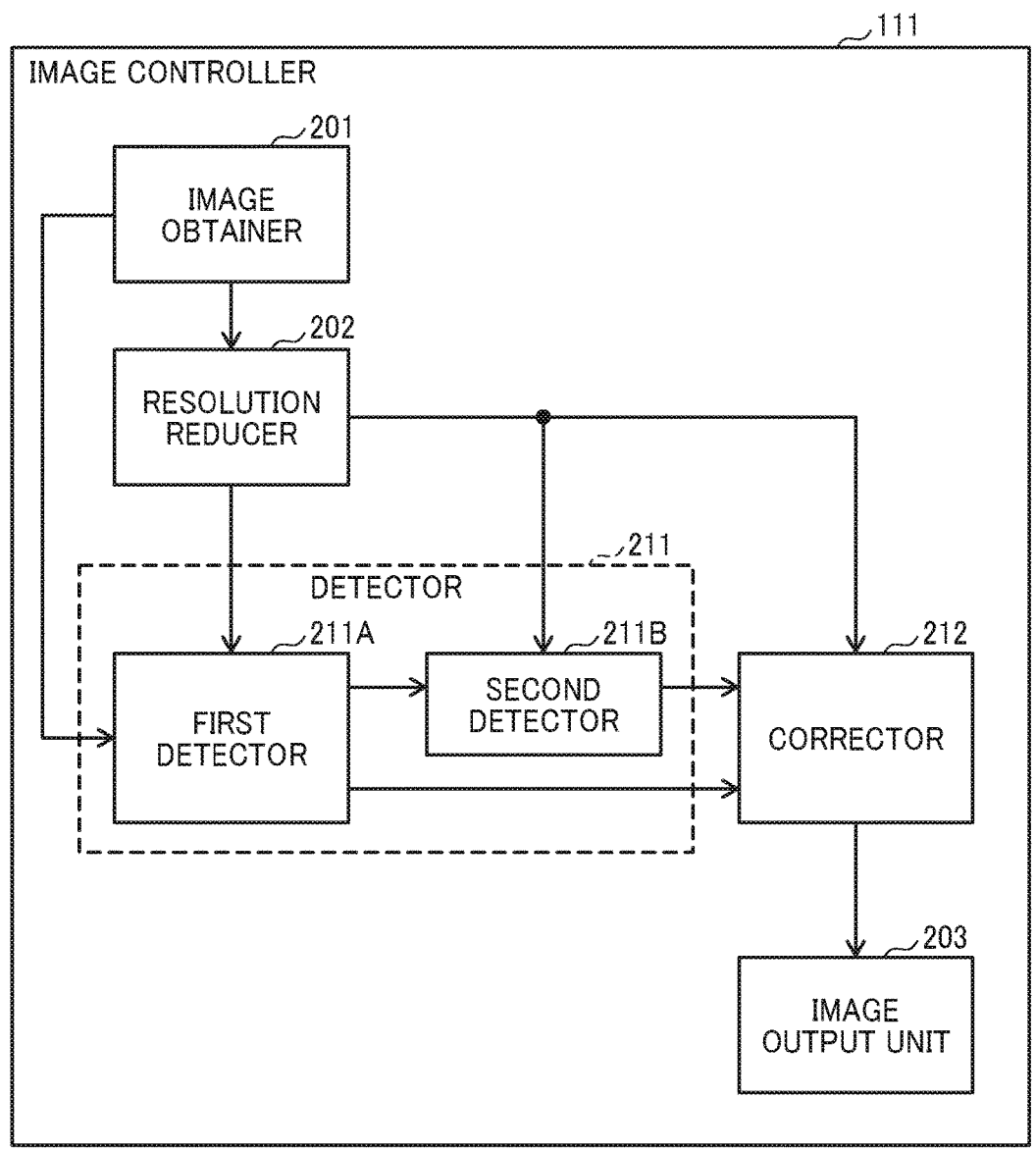

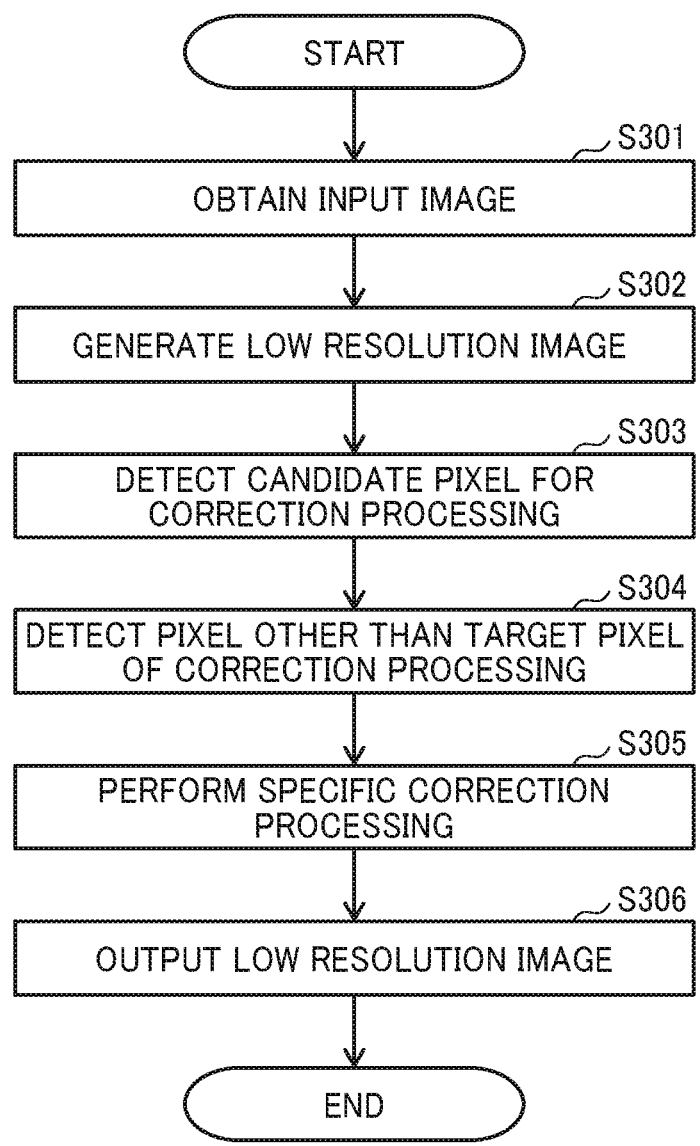

FIRST IMAGE

☐ ONE PIXEL OF UHD

■ ONE PIXEL OF FHD

SECOND IMAGE

☐ ONE PIXEL OF UHD

■ ONE PIXEL OF FHD

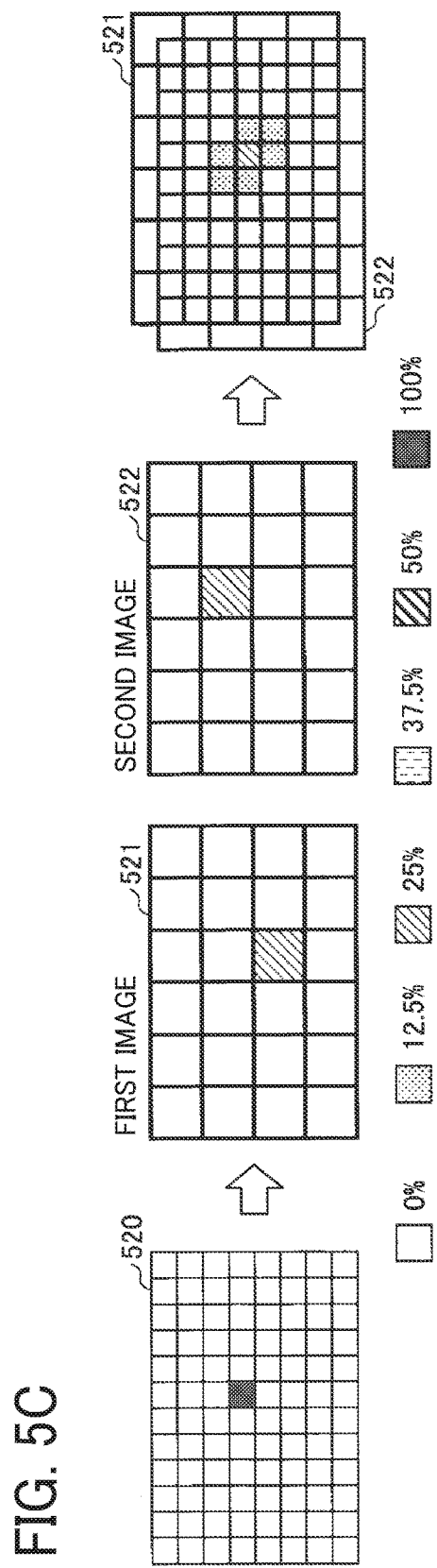

FIG. 6A  FIG. 6B  FIG. 6C  FIG. 6D
   
FIG. 7A
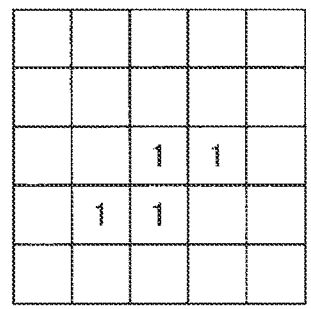
FIG. 7B
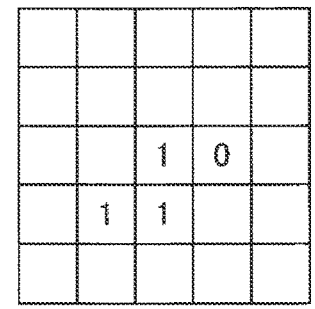

FIG. 9A  FIG. 9B  FIG. 9C  FIG. 9D
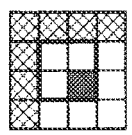 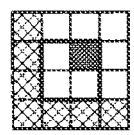 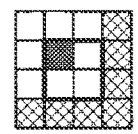 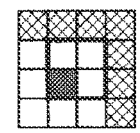
FIG. 10
| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG. 15A

| 0 | 0 | 0 |
|---|---|---|
| 0 | 1 | 0 |
| 0 | 0 | 0 |

FIG. 15B

| 0 | 0 | 0 |
|---|---|---|
| 0 | 4 | 0 |
| 0 | 0 | 0 |

| 1 | 1 | 1 |
|---|---|---|
| 1 | 1 | 1 |
| 1 | 1 | 1 |

| 0 | −1 | 0 |
|---|----|---|
| −1 | 5 | −1 |
| 0 | −1 | 0 |

IMAGE PROCESSING DEVICE, IMAGE PROJECTION APPARATUS, AND IMAGE PROCESSING METHOD

CROSS-REFERENCE TO RELATED APPLICATION

This patent application is based on and claims priority pursuant to 35 U.S.C. § 119(a) to Japanese Patent Application No. 2017-011489, filed on Jan. 25, 2017, in the Japan Patent Office, the entire disclosure of which is hereby incorporated by reference herein.

BACKGROUND

Technical Field

Aspects of the present disclosure relate to an image processing device, an image projection apparatus, and an image processing method.

Related Art

There have been conventionally known image projection apparatuses that project images onto a screen. Some image projection apparatuses can display two images generated from one image in such a manner that the two images are shifted from each other, that is, perform pixel shift display of the two images, to increase image display resolution.

SUMMARY

In an aspect of the present disclosure, there is provided an image processing device that includes a resolution reducer, a detector, and a corrector. The resolution reducer generates, from an input image, low resolution images for pixel shift display being lower in resolution than the input image. The detector detects portions of the low resolution images corresponding to a specific pattern in which image quality degradation may occur. The corrector performs specific correction processing to reduce the image quality degradation on the portions of the low resolution images corresponding to the specific pattern.

In another aspect of the present disclosure, there is provided an image processing method that includes generating, from an input image, low resolution images for pixel shift display being lower in resolution than the input image; detecting portions of the low resolution images corresponding to a specific pattern in which image quality degradation may occur; and performing specific correction processing to reduce the image quality degradation on the portions of the low resolution images corresponding to the specific pattern.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is a block diagram illustrating a functional configuration of an image controller according to the first embodiment of the present disclosure;

FIG. 3 is a flowchart of a procedure of processing by the image controller according to the first embodiment of the present disclosure;

FIGS. 5A to 5C are diagrams illustrating examples of specific pattern detection processing by a detector according to the first embodiment of the present disclosure;

FIGS. 6A to 6D are diagrams illustrating examples (first examples) of detection processing of candidate pixels for correction processing by a first detector according to the first embodiment of the present disclosure;

FIGS. 7A and 7B are diagrams illustrating examples (first examples) of detection processing of pixels other than target pixels of the correction processing by a second detector according to the first embodiment of the present disclosure;

FIGS. 9A to 9D are diagrams illustrating examples (second examples) of detection processing of candidate pixels for the correction processing by the first detector according to the first embodiment of the present disclosure;

FIG. 10 is a diagram illustrating an example (second example) of detection processing of pixels other than target pixels of the correction processing by the second detector according to the first embodiment of the present disclosure;

FIGS. 15A to 15D are diagrams illustrating examples of a smoothing filter and a sharpening filter used by the image controller according to the second embodiment of the present disclosure.

Figure 1:
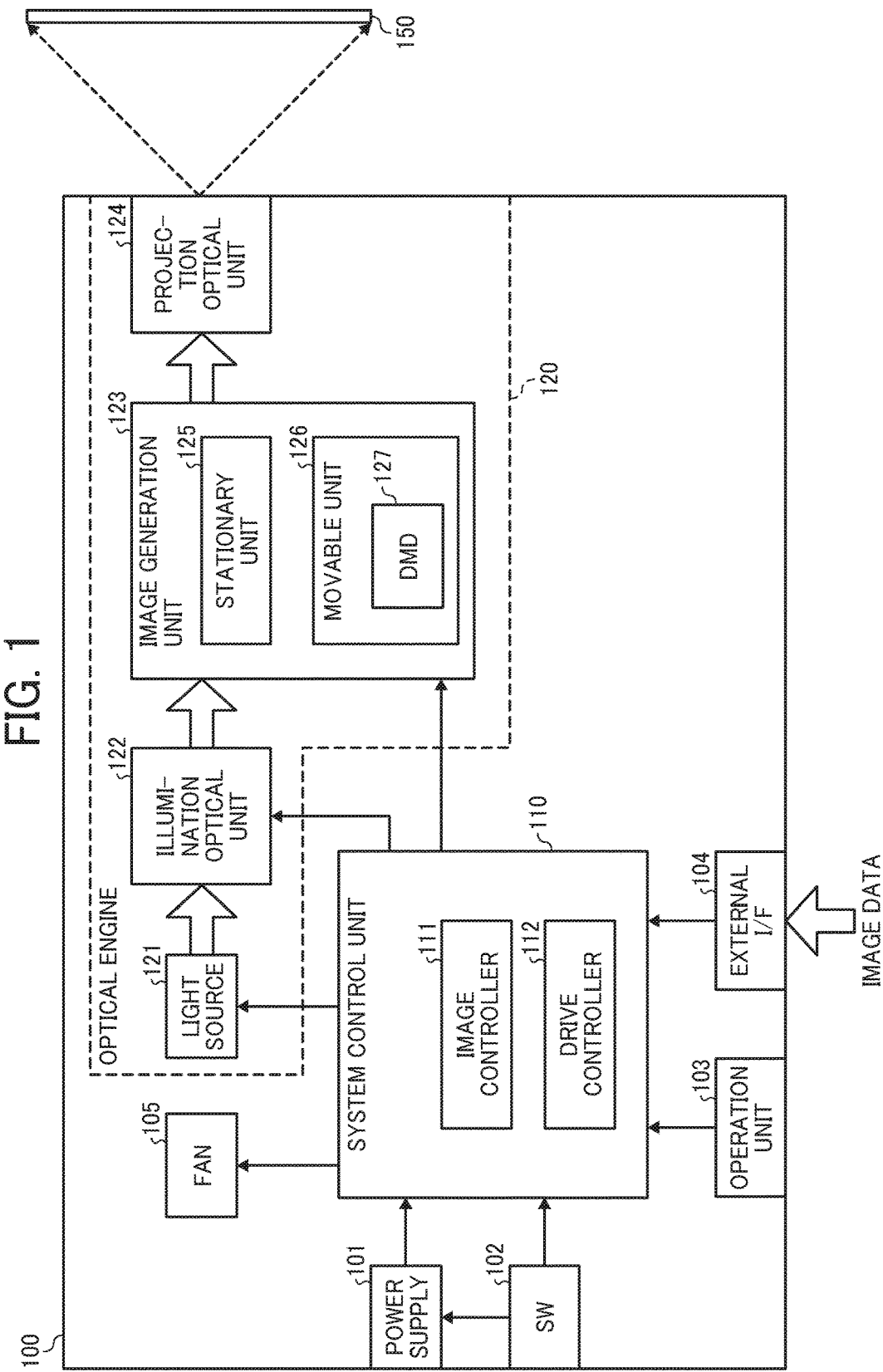
FIG. 1 is a diagram illustrating a configuration of a projector according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A first embodiment of the present disclosure will be described below with reference to the drawings.

Configuration of Projector 100

FIG. 1 is a diagram illustrating a configuration of a projector 100 according to a first embodiment of the present disclosure. The projector 100 is an example of an image projection apparatus according to the present disclosure. The projector 100 can generate a display target image based on image data input from the outside (for example, a personal computer (PC)), and project the display target image onto a screen 150 (an example of a projection plane according to the present disclosure).

As illustrated in FIG. 1, the projector 100 includes a power supply 101, a main switch 102, an operation unit 103, an external interface (I/F) 104, a fan 105, a system control unit 110, and an optical engine 120.

The power supply 101 supplies power to individual components of the projector 100 (for example, the system control unit 110, the fan 105, the optical engine 120, and others). The main switch 102 switches on and off the power supply to the projector 100 by user operation.

The operation unit 103 accepts various user operations. For example, the operation unit 103 is provided on the top of the projector 100 and includes input buttons, a display, and others. The external I/F 104 is coupled to an external device (for example, a PC, a digital camera, or the like) to control input of image data from the external device. The fan 105 cools a light source 121 of the optical engine 120.

The system control unit 110 has an image controller 111 and a drive controller 112. The image controller 111 is an example of an image processing device according to the present embodiment. The image controller 111 generates an image to be projected onto the screen 150 by the optical engine 120, based on the image data input from the external I/F 104. The drive controller 112 controls a movable unit 126 provided in an image generation unit 123 of the optical engine 120 to control the position of a digital micromirror device (DMD) 127 provided in the movable unit 126.

The optical engine 120 is an example of a projector engine according to the present embodiment. The optical engine 120 is controlled by the system control unit 110 to project the image generated by the image controller 111 onto the screen 150. The optical engine 120 has a light source 121, an illumination optical unit 122, an image generation unit 123, and a projection optical unit 124.

The light source 121 emits light. The light source 121 may be a mercury high-pressure lamp, a xenon lamp, a light emitting diode (LED), or the like, for example.

The illumination optical unit 122 guides the light emitted from the light source 121 to the DMD 127. The illumination optical unit 122 has a color wheel, a light tunnel, a relay lens, and the like, for example.

The image generation unit 123 has a stationary unit 125 and the movable unit 126. The movable unit 126 has the DMD 127. The movable unit 126 is controlled in the position with respect to the stationary unit 125 by the drive controller 112 of the system control unit 110. The DMD 127 is controlled by the image controller 111 of the system control unit 110 to modulate the light guided via the illumination optical unit 122 and generate a projection image.

The projection optical unit 124 enlarges the projection image generated by the DMD 127 and projects the same onto the screen 150. The projection optical unit 124 has a plurality of projection lenses, a mirror, and the like, for example.

The thus configured projector 100 can perform appropriate correction processing on images under control of the image controller 111 at the time of pixel shift display of the images, to increase display image quality. This will be specifically described below.

Functional Configuration of Image Controller 111

FIG. 2 is a block diagram illustrating a functional configuration of the image controller 111 according to the first embodiment of the present disclosure. In the example of FIG. 2, the image controller 111 includes an image obtainer 201, a resolution reducer 202, an image output unit 203, a detector 211, and a corrector 212.

The image obtainer 201 obtains an image input from the outside. For example, the image obtainer 201 obtains an ultra high definition (UHD) input image of 3840×2160 pixels.

From the input image obtained by the image obtainer 201, the resolution reducer 202 generates low resolution images for pixel shift display lower in resolution than the input image. Specifically, the resolution reducer 202 generates two low resolution images from the one input image obtained by the image obtainer 201. For example, the resolution reducer 202 generates full high definition (FHD) low resolution images of 1920×1080 pixels from the UHD input image. An example of the resolution reduction processing by the resolution reducer 202 will be described later with reference to FIGS. 4A and 4B.

The detector 211 detects a specific pattern from the input image obtained by the image obtainer 201. The detector 211 specifies portions corresponding to a specific pattern in the low resolution images generated by the resolution reducer 202. The specific pattern in the embodiment refers to a portion in which relatively strong image blurring (equivalent to image quality degradation in the present disclosure) can be caused when two low resolution images are displayed with a pixel shift. The specific pattern may be formed from a single pixel or a plurality of pixels. In the embodiment, the detector 211 detects an oblique line and an isolated point as specific patterns. An example of specific pattern detection processing by the detector 211 will be described later with reference to FIGS. 5A to 5C.

The detector 211 has a first detector 211A and a second detector 211B. The first detector 211A detects pixels with a density of 25% or more (that is, pixels with an average density of 25% of 2×2 pixels in the corresponding input image) in the low resolution images as candidate pixels for the correction processing. The second detector 211B detects pixels not matching the specific pattern, out of the candidate pixels for the correction processing detected by the first detector 211A, (that is, pixels not constituting an oblique line or an isolated point) as pixels other than target pixels of the correction processing). An example of the detection processing of the candidate pixels for the correction processing by the first detector 211A will be described later with reference to FIGS. 6A to 6D. An example of the detection processing of pixels other than target pixels of the correction processing by the second detector 211B will be described later with reference to FIGS. 7A and 7B.

The corrector 212 performs the specific correction processing for reducing image blurring in portions corresponding to the specific pattern detected by the detector 211 in the low resolution images generated by the resolution reducer 202. Specifically, the portions corresponding to the specific pattern refer to the candidate pixels for the correction processing detected by the first detector 211A, which are not detected as pixels other than target pixels of the correction processing by the second detector 211B. In the embodiment, the corrector 212 performs emphasis processing as "specific correction processing". An example of the correction processing by the corrector 212 will be described later with reference to FIG. 8.

The image output unit 203 outputs the low resolution images generated by the resolution reducer 202 (the low resolution images having undergone the correction processing by the corrector 212) to the image generation unit 123 (see FIG. 1). Accordingly, the image output unit 203 causes the optical engine 120 to perform pixel shift display of the low resolution images onto the screen 150. The optical engine 120 alternately switches between the two low resolution images at a frame rate (for example, 120 fps) higher than a normal frame rate (for example, 60 fps) to perform the pixel shift display of the two low resolution images. The pixel shift display is implemented by the DMD 127 shifting in synchronization with the switching timing between the two low resolution images under the control of the drive controller 112.

The image controller 111 includes components, for example, such as central processing unit (CPU), a read only memory (ROM), and a random access memory (RAM). The functions of the image controller 111 described above are implemented by the CPU executing a program recorded on the ROM or the like, for example. This program may be installed in advance into the image controller 111 and provided together with the image controller 111 or may be provided from the outside separately from the image controller 111 and installed into the image controller 111. In the latter case, the program may be provided by an external storage medium (for example, a USB memory, a memory card, a CD-ROM, or the like) or may be provided by downloading from a server on a network (for example, the internet or the like). Some or all components of the image controller 111 may be implemented by hardware. In addition, the image controller 111 may be physically formed from a plurality of circuits.

Procedure of Processing by Image Controller 111

FIG. 3 is a flowchart of a procedure of processing by the image controller 111 according to the first embodiment of the present disclosure.

First, the image obtainer 201 obtains an input image (step S301: image obtaining step). Next, the resolution reducer 202 generates low resolution images from the input image obtained in step S301 (step S302: resolution reduction step). The first detector 211A detects candidate pixels for the correction processing in the low resolution images generated in step S302, based on the input image obtained in step S301 (step S303: first detection step).

Subsequently, the second detector 211B detects pixels other than target pixels of the correction processing, out of the candidate pixels for the correction processing detected in step S303 (step S304: second detection step). The corrector 212 performs the specific correction processing for reducing image blurring on the candidate pixels for the correction processing detected in step S303 (excluding the pixels other than target pixels of the correction processing), in the low resolution images generated in step S302 (step S305: correction step).

After that, the image output unit 203 outputs the low resolution images generated in step S302 (the low resolution images having undergone the correction processing) to the image generation unit 123 (step S306: output step). The image output unit 203 causes the optical engine 120 to perform the pixel shift display of the low resolution images generated in step S302 onto the screen 150. Then, the image controller 111 terminates the series of steps described in FIG. 3.

Examples of Resolution Reduction Processing

Figure 4A:
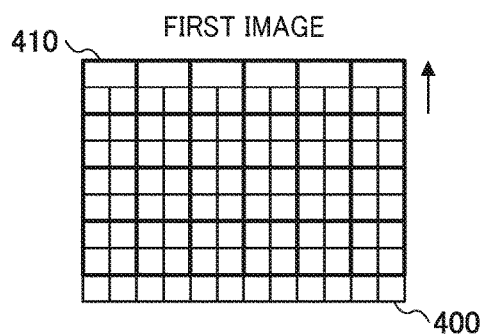
FIGS. 4A and 4B are diagrams illustrating examples of resolution reduction processing by a resolution reducer according to the first embodiment of the present disclosure.
Figure 4B:
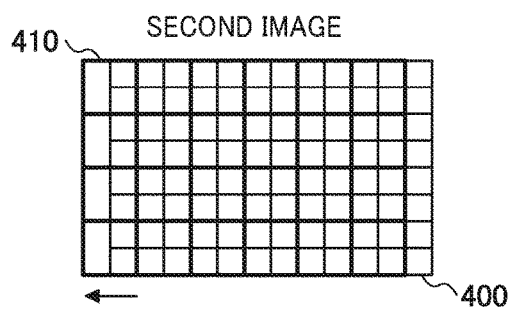

FIGS. 4A and 4B are diagrams illustrating examples of the resolution reduction processing by the resolution reducer 202 according to the first embodiment of the present disclosure. The resolution reducer 202 sets the average pixel value of 2×2 pixels in an input image as pixel value of one pixel in low resolution images.

For example, the resolution reducer 202 first defines a reference frame 410 in which one each box is equivalent to 2×2 pixels in an input image 400 (one pixel in low resolution images). To generates a first low resolution image, the resolution reducer 202 shifts the reference frame 410 upward by one pixel from the input image 400 as illustrated in FIG. 4A, and sets the average pixel value of the 2×2 pixels in each box as pixel value of one pixel in the low resolution image.

To generate a second low resolution image, the resolution reducer 202 shifts the reference frame 410 leftward by one pixel from the input image 400 as illustrated in FIG. 4B, and sets the average pixel value of 2×2 pixels in each box as pixel value of one pixel in the low resolution image.

In the embodiment, the second low resolution image is displayed with a leftward shift from the first low resolution image. Accordingly, the resolution reducer 202 shifts the reference frame 410 leftward as illustrated in FIG. 4B and refers to the pixel values of the 2×2 pixels in the reference frame 410. To display the second low resolution image with a rightward shift from the first low resolution image, the resolution reducer 202 shifts the reference frame 410 rightward and refers to the pixel values of the 2×2 pixels in the reference frame 410.

In the example of FIG. 4A, for the top line of the reference frame 410, the resolution reducer 202 refers to the blank portions above the input image 400. The resolution reducer 202 performs the calculation processing of pixel values of the low resolution image, based on the assumption that the blank portions have the same pixel values as the values of the pixels on the top line of the input image 400.

In the example of FIG. 4B, for the leftmost line of the reference frame 410, the resolution reducer 202 refers to the blank portions on the left side of the input image 400. The resolution reducer 202 performs the calculation processing of pixel values of the low resolution image, based on the assumption that the blank portions have the same pixel values as the values of the pixels on the leftmost line of the input image 400.

Examples of Specific Pattern Detection Processing

Figure 5A:
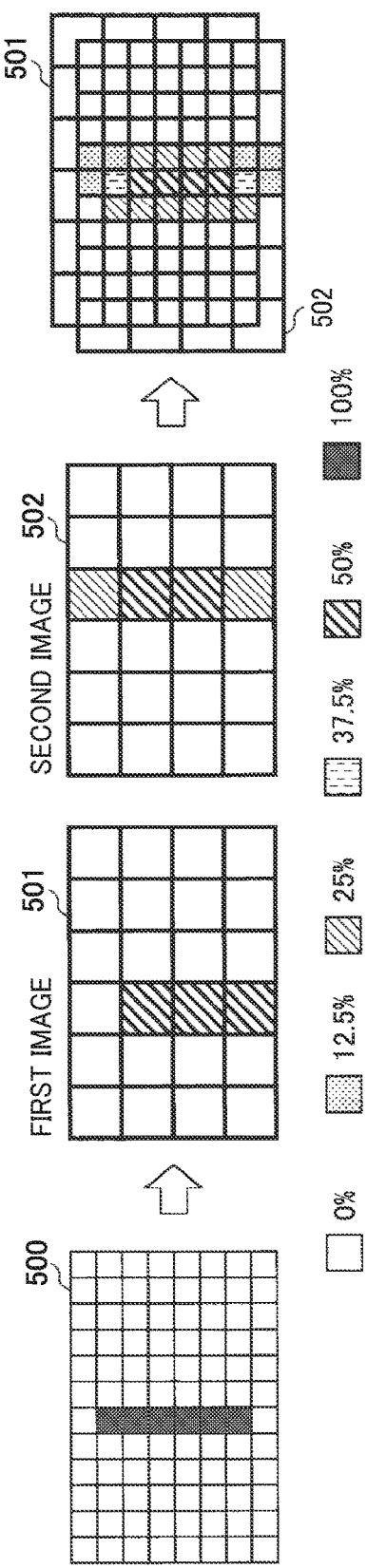
Figure 5B:
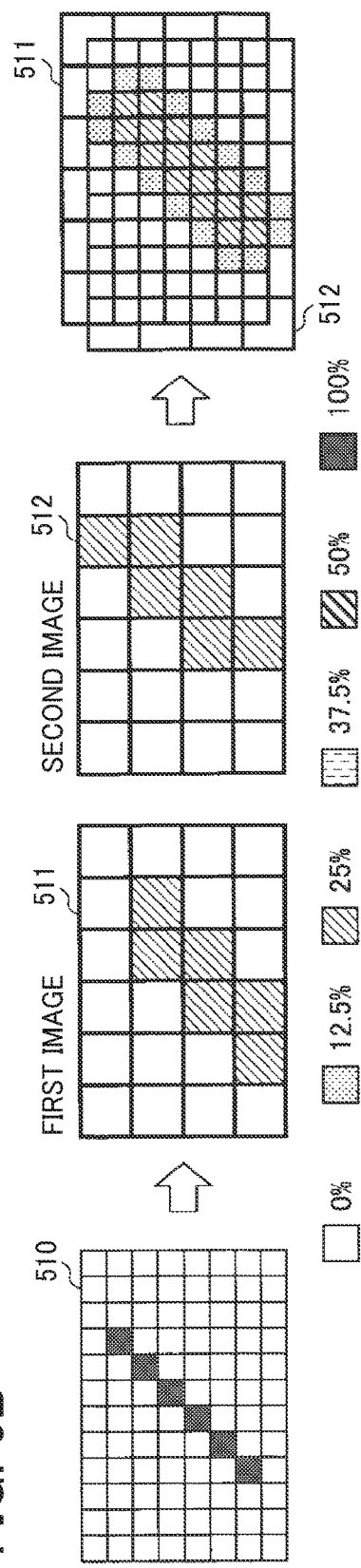

FIGS. 5A to 5C are diagrams illustrating examples of the specific pattern detection processing by the detector 211 according to the first embodiment of the present disclosure. The detector 211 detects the portions of the input image where relatively strong image blurring may occur at the time of resolution reduction, as specific patterns. In particular, in the embodiment, the detector 211 detects an oblique line and an isolated point "as specific patterns". FIGS. 5(a) to 5(c) illustrate the state in which two low resolution images are generated from an input image and are displayed with a pixel shift. In the pixel shift display, the display time of each of the two low resolution images is half of the normal time. Therefore, the density of each pixel visually recognized by the user is half of the normal density.

For example, FIG. 5A (first stage) illustrates an input image 500 including a vertical line (100% black and one-dot width). From the input image 500, the resolution reducer 202 generates a first low resolution image 501 and a second low resolution image 502 illustrated in FIG. 5A (second stage). Then, the low resolution image 502 is displayed with a downward and leftward pixel shift from the low resolution image 501 as illustrated in FIG. 5A (third stage). In the pixel shift display, the density of the densest portion (the vertical line in the center) is 50%. That is, in the pixel shift display, the central portion of the vertical line is emphasized relative to the surrounding portions, and thus there occurs no relatively strong image blurring.

FIG. 5B (first stage) illustrates an input image 510 including an oblique line (100% black and one-dot width). From the input image 510, the resolution reducer 202 generates a first low resolution image 511 and a second low resolution image 512 illustrated in FIG. 5B (second stage). Then, the low resolution image 512 is displayed with a downward and leftward pixel shift from the low resolution image 511 as illustrated in FIG. 5B (third stage). In the pixel shift display, the density of the densest portion (the central portion of the oblique line) is 25%. That is, in the pixel shift display, the density is low overall and thus there occurs relatively strong image blurring.

FIG. 5C (first stage) illustrates an input image 520 including an isolated point (100% black and one dot). From the input image 520, the resolution reducer 202 generates a first low resolution image 521 and a second low resolution image 522 illustrated in FIG. 5C (second stage). Then, the low resolution image 522 is displayed with a downward and leftward pixel shift from the low resolution image 521 as illustrated in FIG. 5C (third stage). In the pixel shift display, the density of the densest portion (the central portion of the isolated point) is 25%. That is, in the pixel shift display, the density is low overall and thus there occurs relatively strong image blurring.

From the foregoing matter, it can be said that an oblique line and an isolated point in the input image are portions where relatively strong image blurring may occur when the low resolution images are displayed with a pixel shift. Accordingly, in the embodiment, the detector 211 detects an oblique line and an isolated point as specific patterns. The corrector 212 performs the correction processing for reducing image blurring on the portions corresponding to the specific patterns in the low resolution images.

Examples of Detection Processing of Candidate Pixels for Correction Processing (First Examples)

FIGS. 6A and 6D are diagrams illustrating examples (first examples) of the detection processing of candidate pixels for correction processing by the first detector 211A according to the first embodiment of the present disclosure. FIGS. 6A to 6D illustrate patterns of 2×2 pixels in an input image (2×2 pixels converted into one pixel in the low resolution images). Each of the patterns illustrated in FIGS. 6A to 6D includes one black pixel and three white pixels. That is, in all the patterns illustrated in FIGS. 6A to 6D, the average density value of the 2×2 pixels is 25%. In the embodiment, the first detector 211A detects the pixel in the low resolution image generated based on the average density value of the 2×2 pixels including one black pixel and three white pixels as described above (that is, the pixel with a density of 25%) as candidate pixel for the correction processing.

Examples of Detection Processing of Pixels Other than Target Pixels of Correction Processing (First Examples)

FIGS. 7A and 7B are diagrams illustrating examples (first examples) of the detection processing of pixels other than target pixels of the correction processing by the second detector 211B according to the first embodiment of the present disclosure. FIGS. 7A and 7B illustrate 5×5 pixels in the low resolution image. Referring to FIGS. 7A and 7B, the pixels set to "1" are candidate pixels for the correction processing detected by the first detector 211A (in the processing illustrated in FIGS. 6A to 6D). The pixel set to "0" is a pixel not detected as a candidate pixel for the correction processing by the first detector 211A (in the processing illustrated in FIGS. 6A to 6D). The blank pixels may be either pixels set to "1" or pixels set to "0".

In the example of FIG. 7A, the four pixels regularly aligned in an oblique direction are all set to "1". In this case, the second detector 211B determines the central one of the 5×5 pixels as an edge pixel of an oblique line (that is, the pixel constituting the specific pattern). Therefore, the second detector 211B does not determine the central pixel as a pixel other than target pixels of the correction processing.

Meanwhile, in the example of FIG. 7B, one of the four pixels regularly aligned in an oblique direction is set to "0". In this case, the second detector 211B determines that the central one of the 5×5 pixels is not edge pixel of an oblique line (that is, the pixel not constituting the specific pattern). Therefore, the second detector 211B determines the central pixel as a pixel other than target pixels of the correction processing.

The second detector 211B may determine target pixels of the correction processing, instead of determining pixels other than target pixels of the correction processing. That is, the second detector 211B may determine the pixels to be targeted in the correction processing as "target pixels of the correction processing", instead of not determining the pixels to be targeted in the correction processing as "the pixels other than target pixels of the correction processing". In contrast, the second detector 211B may determine the pixels not to be targeted in the correction processing as "not target pixels of the correction processing", instead of determining the pixels not to be targeted in the correction processing as "pixels other than target pixels of the correction processing". In addition, for the determination on the pixel to be targeted in the correction processing, the second detector 211B may determine the pixels other than target pixels of the correction processing to find the target pixels of the correction processing by way of contradiction.

Examples of Correction Processing (First Examples)

Figure 8:
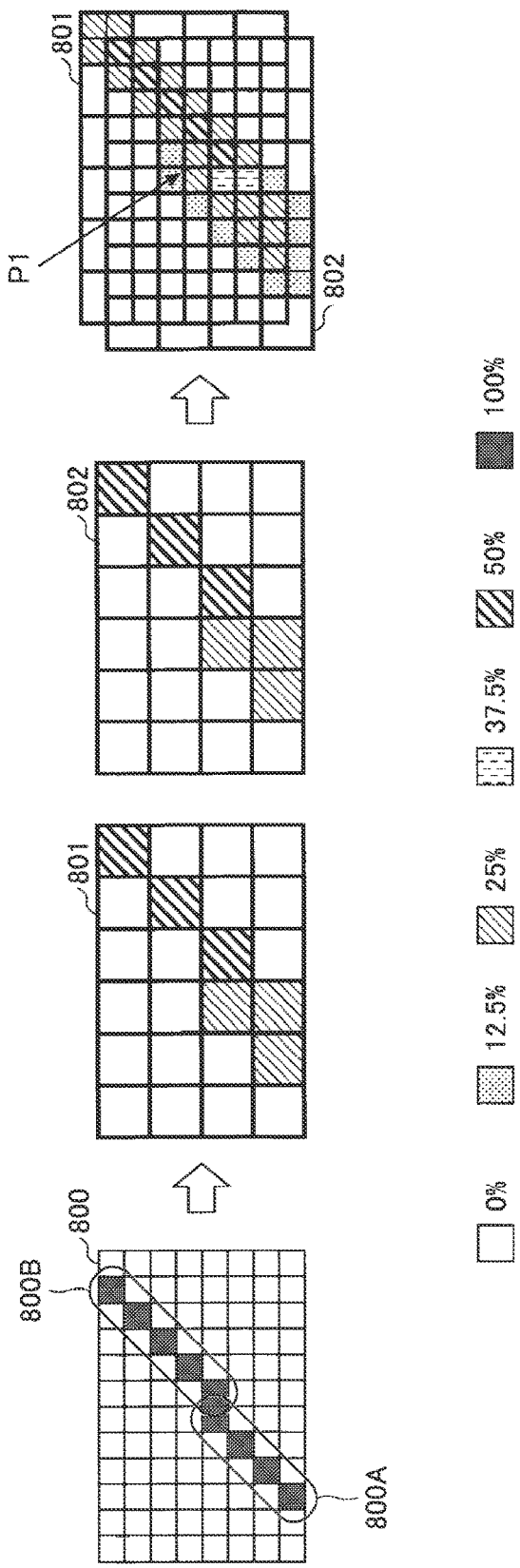
FIG. 8 is a diagram illustrating an example (first examples) of correction processing by a corrector according to the first embodiment of the present disclosure.

FIG. 8 is a diagram illustrating an example (first example) of the correction processing by the corrector 212 according to the first embodiment of the present disclosure. FIG. 8 (first stage) illustrates an input image 800 including a first oblique line 800A and a second oblique line 800B. From the input image 800, the resolution reducer 202 generates a first low resolution image 801 and a second low resolution image 802 illustrated in FIG. 8 (second stage). Then, the low resolution image 802 is displayed with a downward and leftward pixel shift from the low resolution image 801 as illustrated in FIG. 8 (third stage).

The corrector 212 performs emphasis processing on the candidate pixels for the correction processing (excluding the pixels other than target pixels of the correction processing) corresponding to the specific pattern (oblique line) in the low resolution images 801 and 802.

For example, the first oblique line 800A (the downward oblique line in the input image 800) is equivalent to the pattern illustrated in FIG. 7A. Accordingly, the second detector 211B determines the first oblique line 800A as specific pattern (oblique line). Therefore, in the low resolution images 801 and 802, the corrector 212 performs emphasis processing on the pixels corresponding to the first oblique line 800A. Thus, in the low resolution images 801 and 802, the portion equivalent to the first oblique line 800A, which is originally low in density overall, is emphasized. This reduces a difference in density between the portions equivalent to the first oblique line 800A and the second oblique line 800B in the low resolution images 801 and 802. Therefore, image blurring in the portions equivalent to the first oblique line 800A can be reduced.

Meanwhile, the second oblique line 800B (the upward oblique line in the input image 800) is equivalent to the pattern illustrated in FIG. 7B. Accordingly, the second detector 211B does not determine the second oblique line 800B as specific pattern (oblique line). Therefore, in the low resolution images 801 and 802, the corrector 212 does not perform emphasis processing on the pixels corresponding to the second oblique line 800B. Accordingly, in the low resolution images 801 and 802, the portion equivalent to the second oblique line 800B, which is originally high in density overall, is not emphasized. This makes it possible to, when the low resolution images 801 and 802 are displayed with a pixel shift, prevent the portion equivalent to the edge of the second oblique line 800B (for example, a portion P1 illustrated in FIG. 8 (third stage)) from being emphasized like jaggy. Therefore, the portion equivalent to the second oblique line 800B can be visually recognized as a smooth straight line.

The specific correction processing by the corrector 212 is not limited to simple emphasis processing. That is, the specific correction processing by the corrector 212 may be any other processing that allows reduction of image blurring. For example, the specific correction processing by the corrector 212 may be emphasis processing stronger than the general emphasis processing, smoothing processing, or the like.

Examples of Detection Processing of Candidate Pixels for Correction Processing (Second Examples)

FIGS. 9A to 9D are diagrams illustrating examples (second examples) of detection processing of candidate pixels for the correction processing by the first detector 211A according to the first embodiment of the present disclosure. FIGS. 9A to 9D illustrate patterns of 4×4 pixels in an input image. Each of the patterns illustrated in FIGS. 9A to 9D includes 3×3 pixels having a black pixel in the center. The black pixel can be said to be an isolated point. In the 3×3 pixels, the first detector 211A refers to the portion of 2×2 pixels further including one black pixel and three white pixels (surrounded with a thick frame in the drawing). Then, the first detector 211A detects the pixel in the low resolution image corresponding to the 2×2 pixels (that is, the pixel with a density of 25%) as candidate pixel for the correction processing.

Examples of Detection Processing of Pixels Other than Target Pixels of Correction Processing (Second Examples)

FIG. 10 is a diagram illustrating an example (second example) of the detection processing of pixels other than target pixels of the correction processing by the second detector 211B according to the first embodiment of the present disclosure. FIG. 10 illustrates 5×5 pixels in the low resolution image. Referring to FIG. 10, the pixel set to "1" is a candidate pixel for the correction processing detected by the first detector 211A (in the processing illustrated in FIGS. 9A to 9D). The pixels set to "0" are pixels not detected as candidate pixels for the correction processing by the first detector 211A (in the processing illustrated in FIGS. 9A to 9D). The shaded pixels may be either pixels set to "1" or pixels set to "0".

In the example of FIG. 10, only the central one of the 5×5 pixels is set to "1" and the other pixels are all set to "0". In this case, the second detector 211B determines the central one of the 5×5 pixels as isolated point (that is, the pixel constituting the specific pattern). Therefore, the second detector 211B does not determine that the central pixel is a pixel other than target pixels of the correction processing.

In the example of FIG. 10, it is assumed that at least one of the 5×5 pixels except for the central pixel is set to "1", for example. In this case, the second detector 211B determines the central one of the 5×5 pixels as not isolated point (that is, the pixel not constituting the specific pattern). Therefore, the second detector 211B determines that the central pixel is a pixel other than target pixels of the correction processing.

Examples of Correction Processing (Second Examples)

Figure 11:
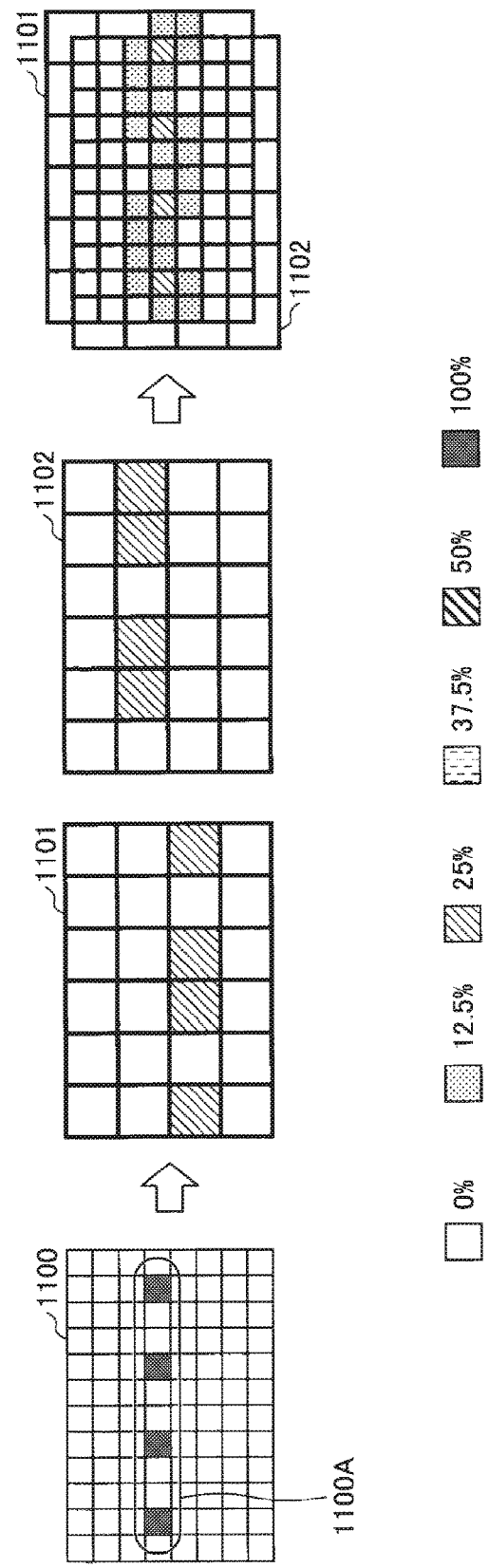
FIG. 11 is a diagram illustrating an example (second example) of correction processing by the corrector according to the first embodiment of the present disclosure.

FIG. 11 is a diagram illustrating an example (second example) of the correction processing by the corrector 212 according to the first embodiment of the present disclosure. FIG. 11 (first stage) illustrates an input image 1100 including a dotted line 1100A. From the input image 1100, the resolution reducer 202 generates a first low resolution image 1101 and a second low resolution image 1102 illustrated in FIG. 11 (second stage). Then, the low resolution image 1102 is displayed with a downward and leftward pixel shift from the low resolution image 1101 as illustrated in FIG. 11 (third stage).

The corrector 212 performs emphasis processing on the candidate pixels for the correction processing (excluding the pixels other than target pixels of the correction processing) corresponding to the specific pattern (isolated point) in the low resolution images 1101 and 1102.

For example, the dotted line 1100A is not equivalent to the pattern illustrated in FIG. 10. Accordingly, the second detector 211B determines that the black pixels included in the dotted line 1100A are not specific pattern (isolated point). Therefore, in the low resolution images 1101 and 1102, the corrector 212 does not perform the emphasis processing on the pixels corresponding to the dotted line 1100A. This makes it possible to prevent emphasis of the portion equivalent to the spacing between the dots in the dotted line 1100A in the low resolution images 1101 and 1102. Accordingly, when the low resolution images 1101 and 1102 are displayed with a pixel shift, for example, it is possible to prevent the portion equivalent to the dotted line 1100A from being visually recognized as solid line.

As described above, the image controller 111 of the embodiment detects the pixels other than target pixels of the correction processing by the pattern illustrated in FIG. 10 to determine the black pixels as pixels other than target pixels of the specific correction processing when the spacing between the black pixels is relatively small. Accordingly, the image controller 111 of the embodiment can prevent the plurality of isolated black pixels from being visually recognized as connected ones. This advantageous effect can also be obtained in stripe patterns, grid patterns, polka-dot patterns, and others as well as dotted lines.

Variation of Correction Processing

Figures 12, 13:
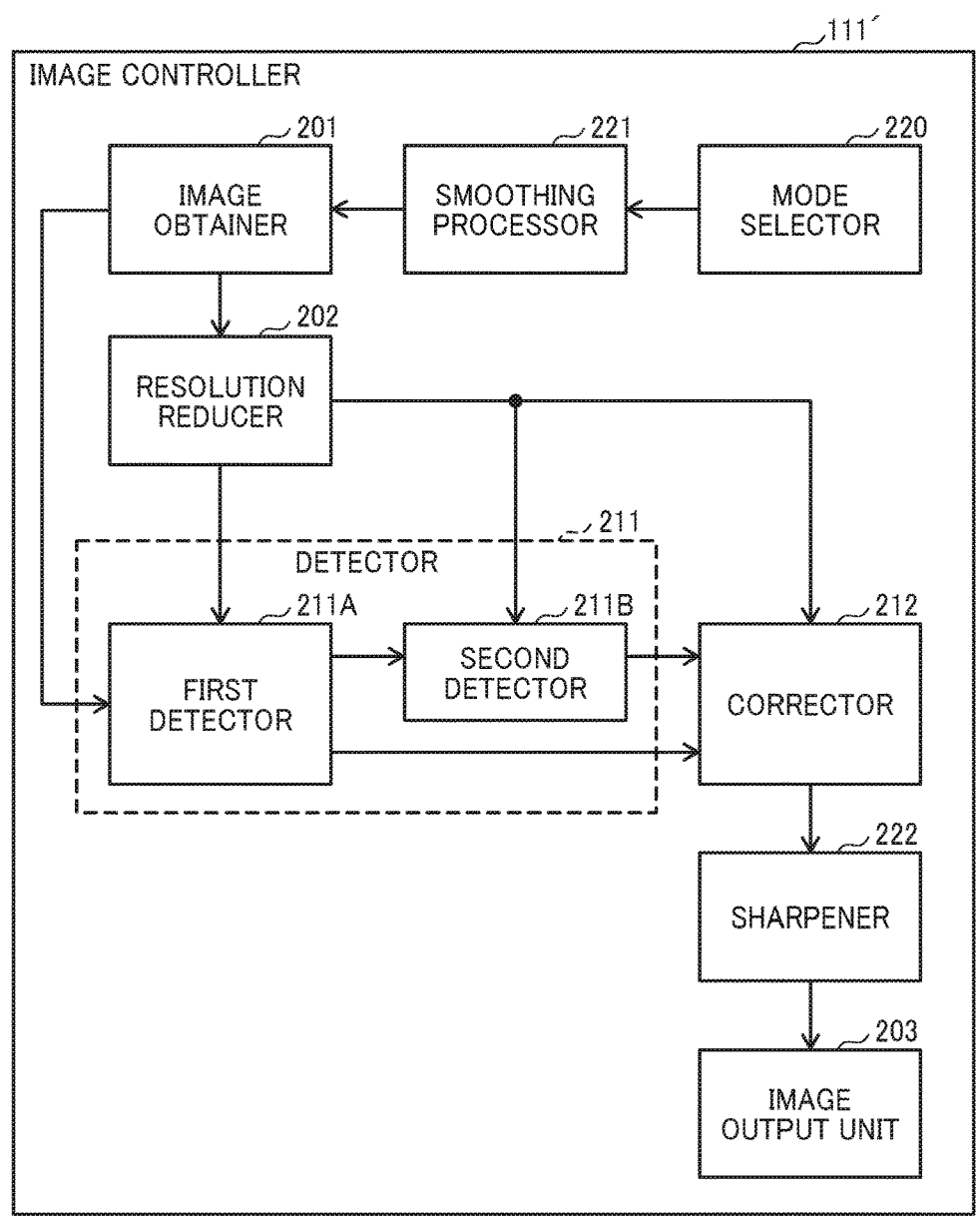
FIG. 12 is a diagram illustrating an example of a filter used in a variation of the correction processing by the corrector according to the first embodiment of the present disclosure.
FIG. 13 is a block diagram illustrating a functional configuration of an image controller according to a second embodiment of the present disclosure.

FIG. 12 is a diagram illustrating an example of a filter used in a variation of the correction processing by the corrector 212 according to the first embodiment of the present disclosure.

In the first embodiment, the image controller 111 may further include a mode selector that selects the image quality mode for the input image from between "natural image mode" (equivalent to a first mode in the present disclosure) and "document image mode" (equivalent to a second mode in the present disclosure). In this case, the corrector 212 may change the correction processing depending on the image quality mode selected by the mode selector. For example, when the natural image mode is selected, the corrector 212 may not perform the specific correction processing described above in relation to the embodiment (the emphasis processing using the result of the detection by the detector 211) but may perform other correction processing on the low resolution images. Meanwhile, when the document image mode is selected, the corrector 212 may perform the specific correction processing described above in relation to the embodiment on the low resolution images.

A natural image hardly includes a binary oblique line pattern or isolated point pattern. Accordingly, when the natural image mode is selected, the corrector 212 may not perform the specific correction processing described above in relation to the embodiment. This makes it possible to prevent the corrector 212 from performing unnecessary processing. In addition, it is possible to prevent the corrector 212 from performing unnatural emphasis processing on the natural image. In addition, when the natural image mode is selected, the corrector 212 may perform emphasis processing with an unsharp mask as a general emphasis processing method instead. In this case, the corrector 212 can perform processing equivalent to the equation {the image before the emphasis processing+(the image before the emphasis processing−smoothing image)×k} to obtain the image having undergone the emphasis processing with an unsharp mask. In the above-described equation, the smoothing image can be the result of the arithmetic operation by a filter illustrated in FIG. 12, for example. In the above-described equation, k represents a parameter for adjustment of emphasis amount.

Meanwhile, a document image includes many binary oblique line patterns and isolated point patterns. Accordingly, when the document image mode is selected, the corrector 212 may perform the specific correction processing described above in relation to the embodiment. In this case, the corrector 212 may perform emphasis processing on the portions corresponding to the specific patterns (oblique lines and isolated points) such that the density of the center is similar to the density of the portions corresponding to the other neighboring patterns (for example, vertical lines, transverse lines, and the like). This makes it possible to reduce image blurring in the portions corresponding to the specific patterns to the similar level of the portions corresponding to the other patterns. In addition, the corrector 212 may perform the emphasis processing with an unsharp mask on the portions corresponding to the other patterns as when the natural image mode is selected.

The user may operate the operation unit 103 to select the image quality mode. Alternatively, the image controller 111 may select automatically the image quality mode. In the latter case, the image controller 111 may determine automatically whether the target image is a natural image or a document image by using, for example, the following method. For example, a density projection histogram is generated based on differential image data of an input image to determine whether the input image is a document image or not depending on the magnitudes of variances in the density projection histogram. In general, in the density projection histogram of a document image, the lines with characters take on large values (peaks) and the portions between the lines take on small values (valleys). Accordingly, when relatively large variances are obtained, the target image can be determined as document image.

In the variation, the corrector 212 can perform appropriate correction processing on the low resolution images depending on the image quality mode of the input image.

Conclusion

As described above, the image controller 111 of the embodiment detects the portions of the low resolution images corresponding to the specific patterns (oblique lines and isolated points) where relatively strong image blurring may occur. The image controller 111 then performs the specific correction processing (emphasis processing) for reducing image blurring on the portions. According to the image controller 111 of the embodiment, when the low resolution images are displayed with a pixel shift, it is possible to reduce image blurring of the projection image projected onto the screen 150. Therefore, according to the image controller 111 of the embodiment, it is possible to enhance the quality of the images displayed with a pixel shift.

In particular, the image controller 111 of the embodiment first detects the candidate pixels for the specific correction processing, and then detects the pixels not matching the specific patterns, out of the candidate pixels for the specific correction processing, as pixels other than target pixels of the specific correction processing. According to the image controller 111 of the embodiment, it is possible to prevent the specific correction processing from being performed on the pixels that would cause trouble if the pixels undergo the specific correction processing.

Second Embodiment

Functional Configuration of Image Controller 111'

Next, a second embodiment of the present disclosure will be described with reference to FIGS. 13 to 15. The differences from the first embodiment will be described here. FIG. 13 is a block diagram illustrating a functional configuration of the image controller 111' according to the second embodiment of the present disclosure. The image controller 111' of the second embodiment is different from the image controller 111 of the first embodiment (FIG. 2) in further including a mode selector 220, a smoothing processor 221, and a sharpener 222.

The mode selector 220 selects the image quality mode. For example, the mode selector 220 selects "office document mode", "still natural image mode", or "movie mode". For example, the mode selector 220 causes the user to choose one of the image quality modes, and selects the image quality mode based on the choice. The smoothing processor 221 performs smoothing processing (smoothing filter processing) on the input image obtained by the image obtainer 201, using a smoothing filter according to the image quality mode selected by the mode selector 220. The sharpener 222 performs sharpening filter processing on the low resolution images generated by the resolution reducer 202, using a sharpening filter.

Procedure of Processing by Image Controller 111'

Figure 14:
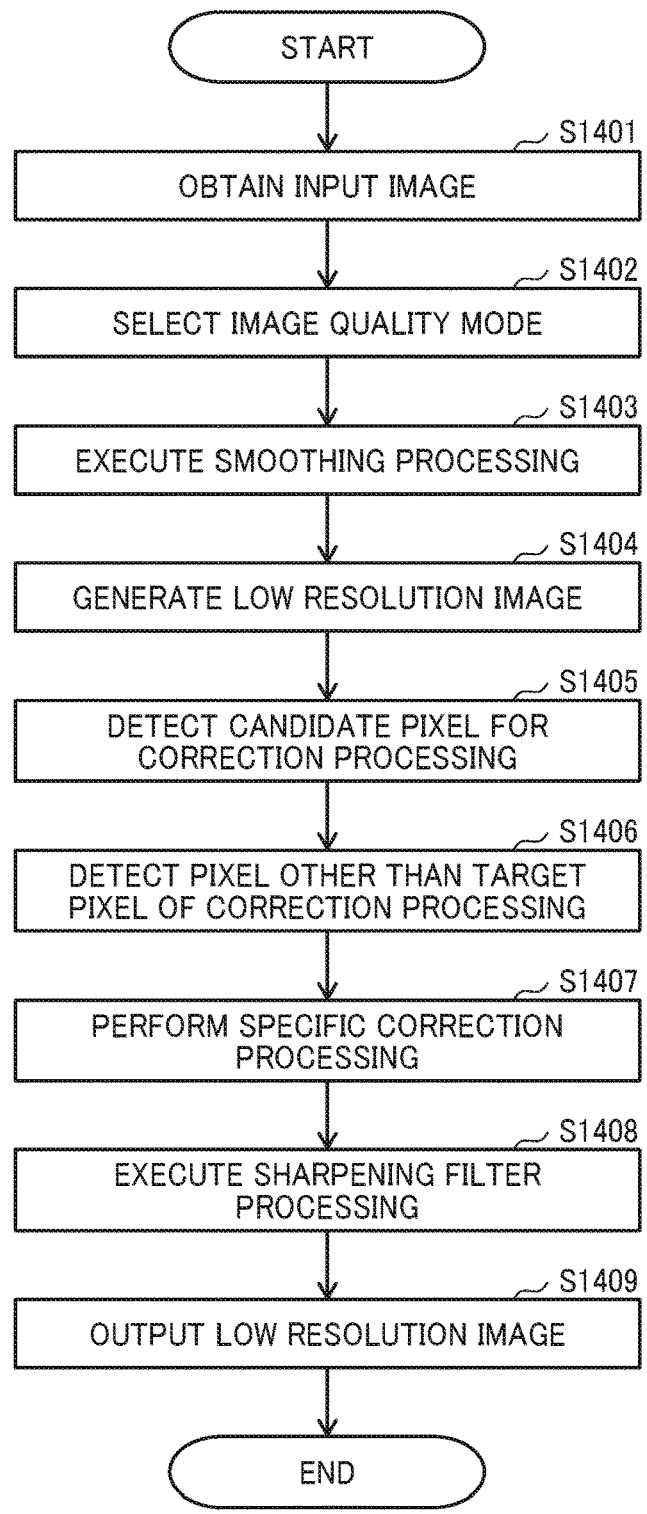
FIG. 14 is a flowchart of a procedure of processing by the image controller according to the second embodiment of the present disclosure.

FIG. 14 is a flowchart of a procedure of processing by the image controller 111' according to the second embodiment of the present disclosure.

First, the image obtainer 201 obtains an input image (step S1401: image obtaining step). Next, the mode selector 220 selects the image quality mode (step S1402: selection step). The smoothing processor 221 performs the smoothing processing on the input image obtained in step S1401 according to the image quality mode selected in step S1402 (step S1403: smoothing step). The resolution reducer 202 generates low resolution images from the input image having undergone the smoothing processing in step S1403 (step S1404: resolution reduction step). The first detector 211A detects the candidate pixels for the correction processing in the low resolution images generated in step S1404, based on the input image having undergone the smoothing processing in step S1403 (step S1405: first detection step).

Subsequently, the second detector 211B detects the pixels other than target pixels of the correction processing, out of the candidate pixels for the correction processing detected in step S1405 (step S1406: second detection step). The corrector 212 performs the specific correction processing on the candidate pixels for the correction processing (excluding the pixels other than target pixels of the correction processing) detected in step S1405 in the low resolution images generated in step S1404 (step S1407: correction step).

The sharpener 222 performs the sharpening processing on the low resolution images having undergone the specific correction processing in step S1407 (step S1408: sharpening step). After that, the image output unit 203 outputs the low resolution images having undergone the sharpening processing in step S1408 to the image generation unit 123 (step S1409: output step). Accordingly, the image output unit 203 causes the optical engine 120 to perform pixel shift display of the low resolution images generated in step S1404 on the screen 150. Then, the image controller 111' terminates the series of steps described in FIG. 14.

Examples of Smoothing Filter and Sharpening Filter

FIGS. 15A to 15D are diagrams illustrating examples of a smoothing filter and a sharpening filter used by the image controller 111' according to the second embodiment of the present disclosure.

When the office document mode is selected, for example, the smoothing processor 221 uses the smoothing filter illustrated in FIG. 15A. This allows the smoothing processor 221 to prevent loss of decimal points and the like.

When the still natural image mode is selected, the smoothing processor 221 also uses the smoothing filter illustrated in FIG. 15A. Accordingly, the smoothing processor 221 allows preferable display of still images desired to be higher in definition. When the still natural image mode is selected, the smoothing processor 221 may use the smoothing filter illustrated in FIG. 15B. Accordingly, the smoothing processor 221 can perform relatively weak smoothing processing to display natural images in a favorable manner.

When the movie mode is selected, the smoothing processor 221 uses the smoothing filter illustrated in FIG. 15C. Accordingly, the smoothing processor 221 can perform relatively strong smoothing processing to display moving images with animated scenes in a gradation-focused smooth manner.

FIG. 15D illustrates an example of a sharpening filter used by the sharpener 222 in the sharpening filter processing.

As described above, according to the image controller 111' of the second embodiment, it is possible to perform appropriate smoothing processing according to the selected image quality mode. Therefore, according to the image controller 111' of the second embodiment, it is possible to further enhance the display image quality at the time of pixel shift display.

Variation

Figure 16:
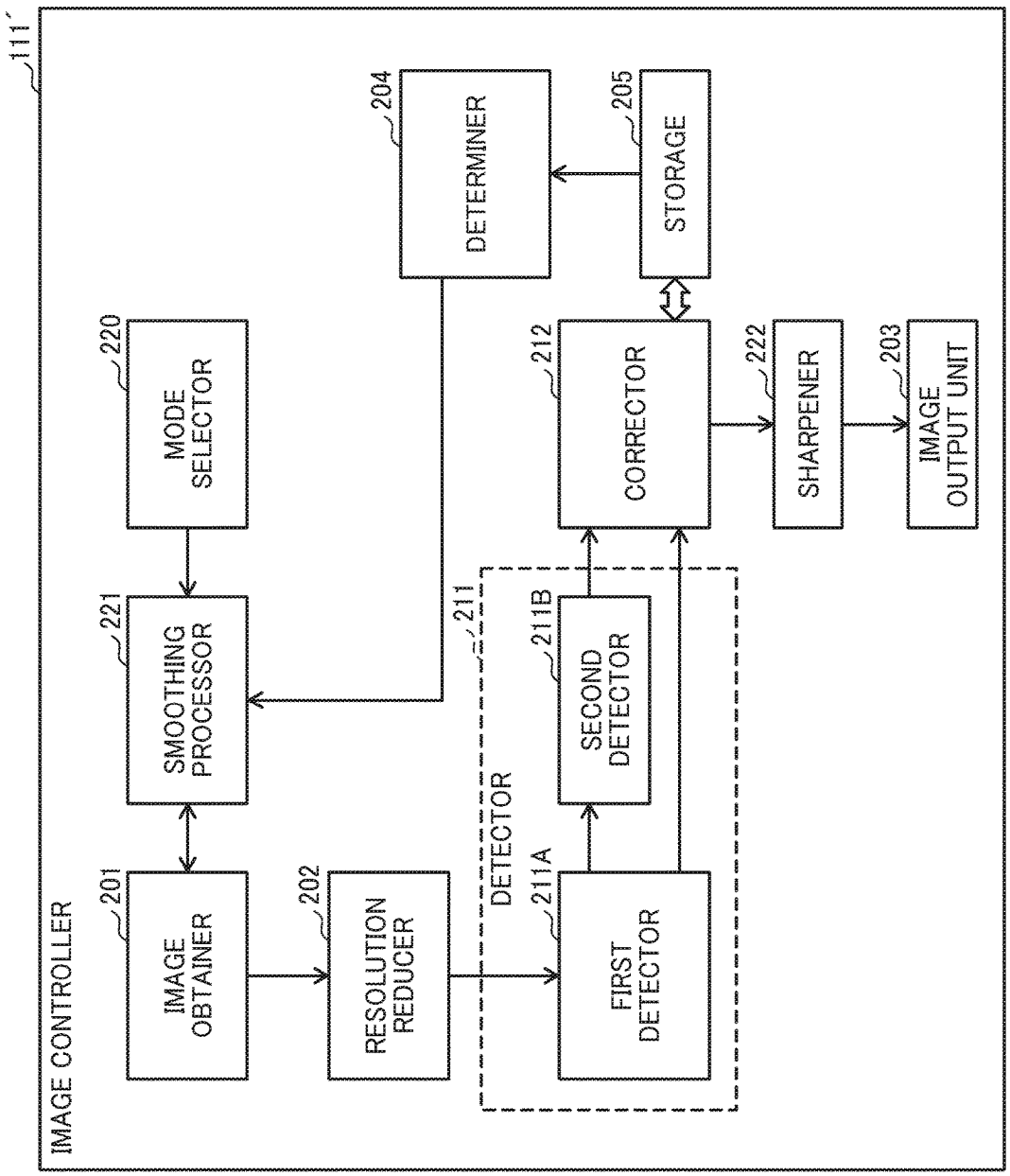
FIG. 16 is a block diagram illustrating a functional configuration of the image controller according to a variation of the second embodiment of the present disclosure.

In the second embodiment, as illustrated in FIG. 16, a determiner 204 may further be provided to determine the magnitude of motion of the image. In this case, when the movie mode is selected, the smoothing processor 221 may decide the smoothing filter for use in the smoothing processing, based on the result of the determination by the determiner 204.

For example, the determiner 204 stores a previous frame image in the low resolution image in a storage 205. The determiner 204 then determines the image motion level from information about the total sum of absolute values of the differences between the current frame image and the previous frame image. Specifically, focusing on some partial display area, the determiner 204 calculates the total sum (x) of absolute values of the differences between the pixel values of the current frame image and the pixel values of the previous frame image in that area. When the total sum (x) is equal to or less than a predetermined threshold Th_x, the determiner 204 determines that the motion of the current frame image is small. In contrast, when the total sum (x) is greater than the predetermined threshold Th_x, the determiner 204 determines that the motion of the current frame image is large. In this case, the determiner 204 makes a determination based on the low resolution image, which can reduce the amount of data for use in the determination to ¼ of the input image. Further, the determiner 204 makes a determination focusing on some partial display area, which can reduce the amount of data for use in the determination.

For example, when the determiner 204 determines that the motion of the image is small, the smoothing processor 221 may use the smoothing filter illustrated in FIG. 15A. Accordingly, the smoothing processor 221 allows display of the image desired to be higher in definition in a favorable manner when the motion of the image is relatively small.

For example, when the determiner 204 determines that the motion of the image is large, the smoothing processor 221 may use the smoothing filter illustrated in FIG. 15C. Accordingly, the smoothing processor 221 can perform relatively strong smoothing processing on the image in relatively large motion to display the image in a gradation-focused smooth manner.

In the above-described variation, when the determiner 204 changes the determination result, the smoothing processor 221 may perform the smoothing processing using the smoothing filter according to the changed determination result. In this case, the smoothing processor 221 may change the smoothing filters in stages so that the strength of the smoothing processing can change gradually. Accordingly, the smoothing processor 221 can reduce a feeling of strangeness resulting from the changes in the strength of the smoothing processing. For example, it is assumed that the determiner 204 changes the determination result from "large motion" to "small motion". In this case, the smoothing processor 221 may use the smoothing filter illustrated in FIG. 15B for the image one frame after, and use the smoothing filter illustrated in FIG. 15A for the image two frame after.

In the above-described variation, the determiner 204 determines the magnitude of the motion of the image in two stages. However, the determination stages are not limited to this, but the determiner 204 may determine in three or more stages. The smoothing processor 221 may use the smoothing filter according to each of the determination results in the stages. Accordingly, the smoothing processor 221 can reduce a feeling of strangeness resulting from the changes in the strength of the smoothing processing. For example, when the determiner 204 determines that the motion of the image is small, the smoothing processor 221 may use the smoothing filter illustrated in FIG. 15A for the image one frame after. For example, when the determiner 204 determines that the motion of the image is normal, the smoothing processor 221 may use the smoothing filter illustrated in FIG. 15B for the image one frame after. For example, when the determiner 204 determines that the motion of the image is large, the smoothing processor 221 may use the smoothing filter illustrated in FIG. 15C for the image one frame after.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing device comprising:
a resolution reducer to generate, from an input image, low resolution images for pixel shift display being lower in resolution than the input image;
a detector to detect portions of the low resolution images corresponding to a specific pattern in which image quality degradation may occur; and
a corrector to perform specific correction processing to reduce the image quality degradation on the portions of the low resolution images corresponding to the specific pattern.

2. The image processing device according to claim 1, wherein the specific pattern includes an oblique line.

3. The image processing device according to claim 1, wherein the specific pattern includes an isolated point.

4. The image processing device according to claim 1, wherein the detector includes:
a first detector to detect pixels with a density equal to or less than a predetermined value in the low resolution images as candidate pixels for the specific correction processing; and
a second detector to detect pixels matching the specific pattern, out of the candidate pixels for the specific correction processing, as target pixels of the specific correction processing.

5. The image processing device according to claim 1, wherein the specific correction processing includes emphasis processing on the portions corresponding to the specific pattern.

6. The image processing device according to claim 5, wherein, in the specific correction processing, density of the portions corresponding to the specific pattern is enhanced to a similar degree of density of portions corresponding to other neighboring patterns.

7. The image processing device according to claim 1, further comprising a mode selector to select an image quality mode,
wherein, when the mode selector selects a first mode corresponding to natural image display as the image quality mode, the corrector does not perform the specific correction processing on the low resolution images, and
wherein, when the mode selector selects a second mode corresponding to document image display as the image quality mode, the corrector performs the specific correction processing on the low resolution images.

8. The image processing device according to claim 1, further comprising:
a mode selector to select an image quality mode; and
a smoothing processor to perform smoothing processing on the input image using a smoothing filter according to the image quality mode selected by the mode selector.

9. The image processing device according to claim 8, further comprising a determiner to determine magnitude of image motion in the low resolution images,
wherein the smoothing processor performs the smoothing processing using a smoothing filter according to the magnitude determined by the determiner and the image quality mode selected by the mode selector.

10. An image projection apparatus comprising:
the image processing device according to claim 1; and
a projector engine to project the low resolution images generated by the image processing device onto a projection plane to display the low resolution images with a pixel shift on the projection plane.

11. An image processing method comprising:
generating, from an input image, low resolution images being lower in resolution than the input image;
detecting portions of the low resolution images corresponding to a specific pattern; and
performing specific correction processing on the portions of the low resolution images corresponding to the specific pattern.

12. An image processing device comprising:
a resolution reducer to generate, from an input image, low resolution images being lower in resolution than the input image;
a detector to detect portions of the low resolution images corresponding to a specific pattern; and
a corrector to perform specific correction processing on the portions of the low resolution images corresponding to the specific pattern.

* * * * *